United States Patent [19]

Pearson

[11] Patent Number: 4,530,075
[45] Date of Patent: Jul. 16, 1985

[54] MARINE SEISMIC STREAMER COUPLER

[75] Inventor: Raymond H. Pearson, Richardson, Tex.

[73] Assignee: Whitehall Corporation, Dallas, Tex.

[21] Appl. No.: 530,979

[22] Filed: Sep. 9, 1983

[51] Int. Cl.³ .......................... G01V 1/00; H04B 13/00
[52] U.S. Cl. ..................................... 367/20; 367/154; 339/47 R; 339/49 R
[58] Field of Search .............. 367/20, 15, 18, 19, 367/154; 339/47 R, 49 R

[56] References Cited

U.S. PATENT DOCUMENTS 3,812,455  5/1974  Pearson ........................ 339/49 R
4,204,188  5/1980  Weichart et al. ............. 339/47 R
4,351,036  9/1982  Mollere ........................... 367/20

Primary Examiner—Nelson Moskowitz
Assistant Examiner—Ian Lobo
Attorney, Agent, or Firm—Hubbard, Thurman, Turner & Tucker

[57] ABSTRACT

Disclosed is a coupler for connecting together electrically and mechanically adjacent sections of a marine seismic streamer. The coupler includes a split cylindrical electrical connector housing assembly which establishes electrical interconnection between the adjacent streamer sections. The coupler includes an outer sleeve, which surrounds the electrical connector assembly and transmits tension forces across the coupler.

15 Claims, 3 Drawing Figures

MARINE SEISMIC STREAMER COUPLER

BACKGROUND OF THE INVENTION

A. Summary of the Invention

The present invention relates generally to marine seismic streamers of the type including multiple serially connected streamer sections and more particularly, to a coupler for connecting together adjacent pairs of such streamer sections.

B. Description of the Prior Art

Heretofore, a number of marine seismic streamers have been developed for making seismic surveys of the earth formations underlying bodies of water. In general, such marine seismic streamers include a lead-in cable and a plurality of serially connected sections formed of oil flled plastic tubes surrounding stress members, and various instruments, such as hydrophones, and associated electrical equipment, such as wires and transformers. Examples of such streamers are disclosed in U.S. Pat. Nos. 2,465,696, and U.S. Pat. No. 3,371,739. Such marine seismic streamers are often as long as two miles and are made up of multiple streamer sections, each having a length of up to about 300 feet.

Various coupler devices have been developed to connect together adjacent seismic streamer sections. Such couplers must provide a high strength mechanical connection to transmit tension and torque between the stress members of the adjacent streamer sections and a reliable substantially water proof electrical connection between the electrical conductors of adjacent sections. Advantageously, a coupler should be compact and relatively light in weight. Additionally, a coupler should present a clean streamlined external profile so as to reduce turbulence as the streamer is towed through the water. Moreover, a coupler should be easy to connect and disconnect. Examples of streamer couplers are disclosed in U.S. Pat. Nos. 3,376,948, 3,812,455, 4,260,211, and U.S. patent application Ser. No. 295,499, filed Aug. 24, 1981.

In the coupler of U.S. Pat. No. 4,260,211, tension forces are transmitted across the coupler by a quick connect sleeve. The quick connect sleeve defines a cavity in which electrical connection is established by means of a floating connector. Establishing the electrical connection with the floating connector is often time consuming.

The coupler of U.S. Pat. No. 3,812,455, includes mating semicylindrical portions with male and female electrical plugs mounted along the diametrical planes thereof. The semi-cylindrical portions are mechanically connected together by means of bolts. The tension forces are carried by the semi-cylindrical portions and the bolts. Thus, the semi-cylindrical portions must be high strength, relatively heavy structures. The coupler of U.S. patent application Ser. No. 295,499, filed Aug. 24, 1981, likewise includes mating semi-cylindrical portions that are held together by locking rings. The semi-cylindrical portions include interfitting alternating teeth, which transmit tensile forces across the coupler.

The coupler of U.S. patent application Ser. No. 295,499 is lighter than that of U.S. Pat. No. 3,812,455; however, it is necessarily high strength and of relatively heavy construction. The electrical plugs in the coupler of U.S. patent application Ser. No. 295,499 are supported in floating relation relative to the coupler body so that deformation of the coupler body is not transmitted to the plugs. The floating arrangement of the plugs occasionally makes it difficult to assemble the coupler. Additionally, both the couplers of U.S. Pat. No. 3,812,455, and U.S. patent application Ser. No. 295,499, require elaborate sealing arrangements to preserve their watertight integrity.

It is an object of the present invention to provide an improved seismic streamer coupler that overcomes the shortcomings of the prior art. More specifically, it is an object of the present invention to provide a high strength, light weight seismic streamer couple that may be readily coupled and uncoupled in the field.

SUMMARY OF THE INVENTION

Briefly stated, the foregoing and other objects are accomplished by the coupler of the present invention. The coupler includes a pair of axially spaced apart generally cylindrical connector sleeves, each of which is adapted for sealingly interconnecting at one end with an outer jacket of an adjacent seismic streamer section. Each of the connector sleeves includes a radially outwardly extending shoulder that faces toward the end that establishes interconnection with the outer jacket and each connecter sleeve has an axial bore therethrough.

Each connector sleeve has connected thereto an axially extending semi-cylindrical electrical connector sleeve. Each electrical connector sleeve has mounted thereto a plurality of mating plug/socket type electrical connectors which establish electrical connection between the electrical conductors of the adjacent streamer sections. The electrical connector sleeves are fastened together to form a generally cylindrical electrical housing and mate together the electrical connectors.

Each connector sleeve has mounted therein a generally cylindrical stress member terminator block. Each stress member terminator block is connected to the stress members of the adjacent streamer sections. A snap ring or the like is provided for interconnecting each stress member terminator block with its associated connector sleeve and, thereby, transmit forces from the stress members to the connector sleeves.

Each connector sleeve has positioned thereabout a generally cylindrical connector nut. Each connector nut includes a radially inwardly extending shoulder that is adapted to abut with the radially outwardly extending shoulders of the connector sleeves. An outer sleeve is positioned about the electrical connector sleeves and is connected between the connector nuts. Seals are provided for sealing between the connector sleeves and the outer sleeve and around the electrical conductor wires that enter the coupler.

Tension forces are transmitted from the stress members into their associated stress member terminator blocks, which forces are in turn transmitted to the connector sleeves through the snap ring. Axially outward movement of the connector sleeves is opposed by the connector nuts, which are connected together by the outer sleeve.

DESCRIPTION OF THE PREFERRED EMBODIMENT

Figure 1:
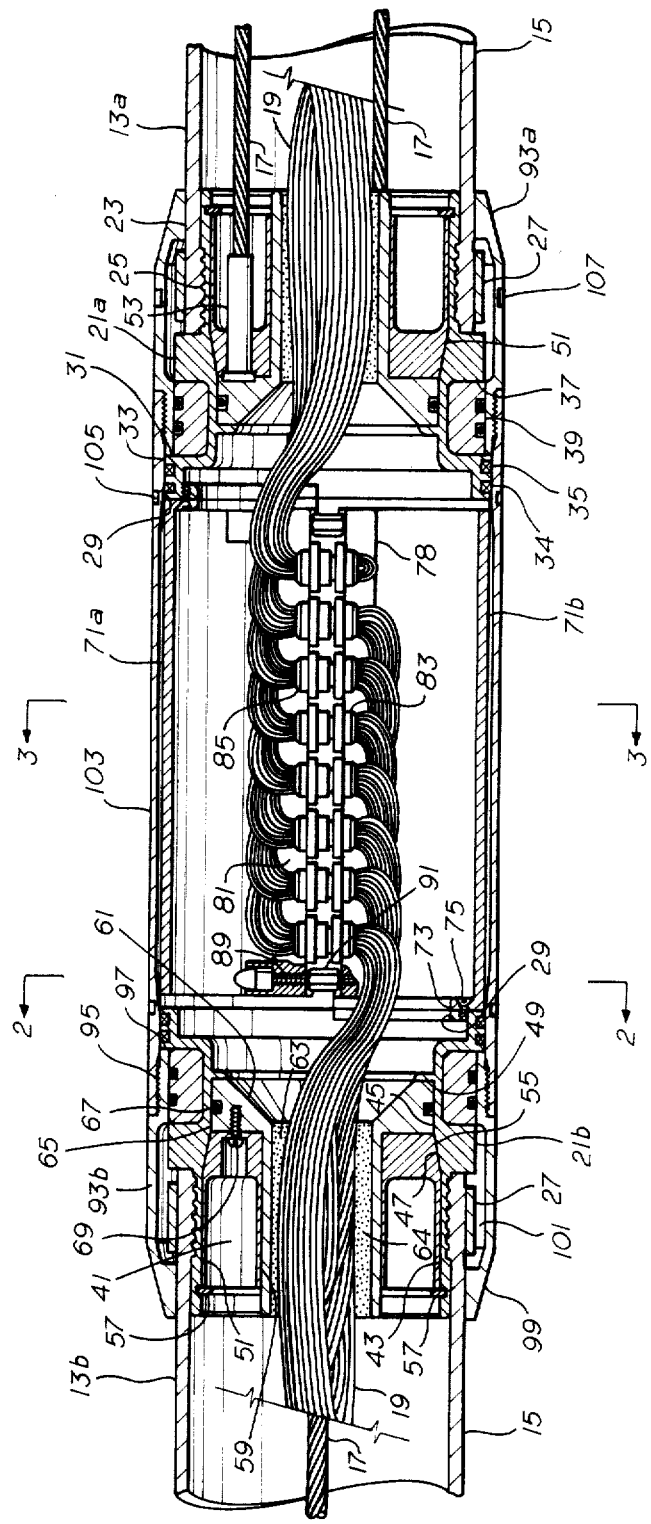
FIG. 1 is a side sectional view of the coupler of the present invention.

Referring now to the drawings, and first to FIG. 1, the seismic streamer coupler of the present invention is designated generally by the numeral 11. Coupler 11 is disposed between and mechanically and electrically interconnects adjacent sections 13a and 13b of a seismic streamer. Sections 13a and 13b are substantially identical, and each includes a plastic jacket or sheeth 15, one or more wire rope stress members 17, and a bundle of electrical conductors 19. Streamer sections, such as 13a and 13b, are normally oil filled so as to maintain substantially neutral buoyancy, and typically contain various other devices useful in collecting or generating data. The general method of operation of seismic streamers in conducting seismic exploration is disclosed in U.S. Pat. No. 2,465,696, and the construction of streamer sections is generally illustrated in U.S. Pat. Nos. 3,371,739, or 3,812,455.

Coupler 11 includes a pair of axially spaced apart connector sleeves 21a and 21b, which are substantially identical. Connector sleeve 21a includes a generally cylindrical outer end 23 which includes a plurality of axially spaced apart annular ridges 25. Outer end 23 is adapted for insertion into jacket 15 of streamer section 13a to establish a sealing interconnection therewith by means of a conventional clamp 27 positioned and clamped about ridges 25.

Connector sleeve 21a includes an axially forward end having an axially inwardly facing semi circular mounting flange 29 and an axially outwardly facing abutment shoulder 31. An annular sealing surface 33 is positioned between mounting flange 29 and abutment shoulder 31 and includes a pair of annular grooves adapted to receive seals, as for example x-rings 34 and 35.

Connector sleeve 21a includes axially outward of abutment shoulder 31 a spacer groove 37 which contains a split spacer ring 39. Spacer ring 39 includes a pair of axially spaced apart annular grooves which contain O-rings to hold the split spacer ring 39 together.

Referring particularly to connector sleeve 21b, each connector sleeve includes an axial bore 41. Axial bore 41 is defined by axially spaced apart internal cylindrical surfaces 43 and 45 and an intermediate outwardly facing frusto conical surface 47. An annular axially outwardly facing stop shoulder 49 is positioned adjacent cylindrical surface 45.

Each connector sleeve 21a or 21b has mounted in its bore 41 a generally cylindrical stress member terminator block 51. Stress member terminator block 51 is adapted to receive and mechanically interconnect with the ends of stress members 17. The end of each stress member 17 is swaged into a cable terminator 53, which is received in stress member terminator block 51.

Stress member terminator block 51 is restrained against axially inward motion within bore 41 by the abutment of a frusto conical surface 55 with intermediate surface 47. Stress member terminator block 51 is restrained against axially outward movement with respect to connector sleeve 21b by means of a snap ring 57 which is received in a groove in cylindrical surface 43. Thus, outwardly directed stress forces on stress members 17 are transmitted from stress member terminator block 51 through snap ring 57 into connector sleeve 21b.

Stress member terminator block 51 includes an axially extending cylindrical bore 59, which receives an electrical conductor packing box 61. Electrical conductor packing box 61 is preferably formed from a plastic material and includes an axially extending cylindrical bore 63 for the passage of electrical conductors 19 therethrough. Electrical conductors 19 are potted into bore 63 with an epoxy resin or the like potting material 64. Electrical conductor packing box 61 includes a cylindrical outer sealing surface 65, which fits within cylindrical surface 45 of connector sleeve 21b. An O-ring 67 is positioned in a groove in outer surface 65 to form a seal between electrical conductor packing box 61 and connector sleeve 21b. Thus, electrical conductor packing box 61 forms a physical block or barrier between streamer section 13b and the interior of coupler 11.

Electrical conductor packing box 61 is restrained against axially inward movement by its abutment with stop shoulder 49. Electrical conductor packing box 61 is restrained against axially outward movement by its abutment with stress member terminal block 51. Electrical conductor packing box 61 may be mechanically interconnected with stress member terminal block 51 by means of a plurality of screws 69.

Figure 3:
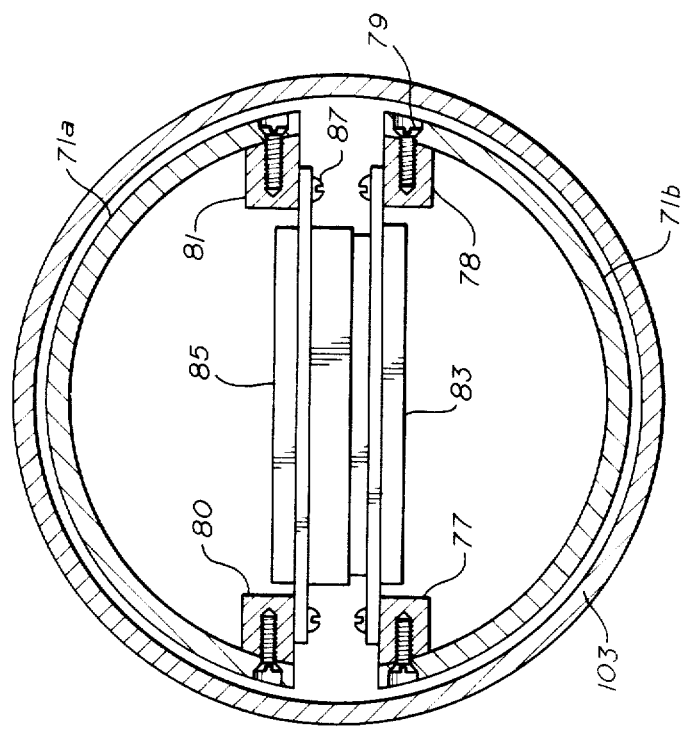
FIG. 3 is a transverse sectional view along line 3—3 of FIG. 1.
Figure 2:
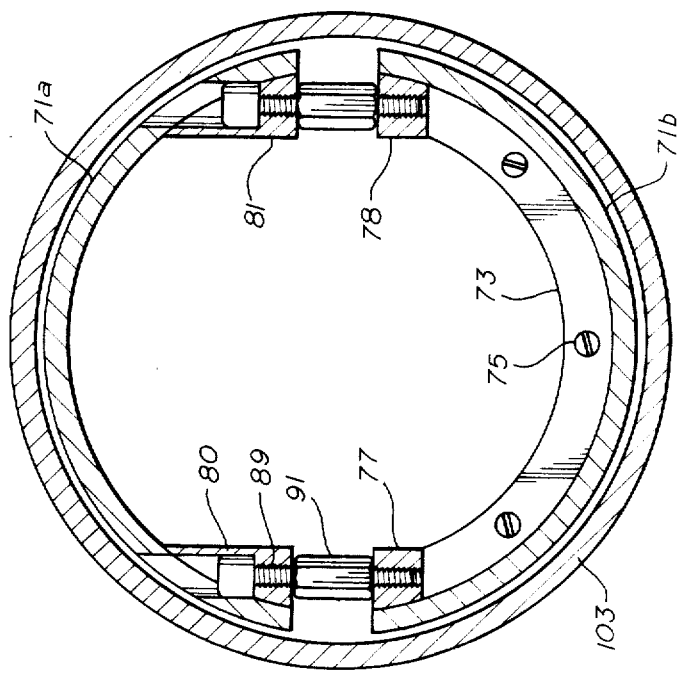
FIG. 2 is a transverse sectional view along line 2—2 of FIG. 1.

Each connector sleeve 21a and 21b has connected thereto a semi-cylindrical electrical connector sleeve 71a and 71b, respectively. Electrical connector sleeves are preferably made of a light weight metal, such as aluminum. Referring to FIGS. 1 and 2, electrical connector sleeve 71b includes a semi-circular mounting flange 73 which is connected to mounting flange 29 of connector sleeve 21b by a plurality of screws 75. As is best shown in FIGS. 2 and 3, electrical connector sleeve 71b has mounted thereto by means of screws 79 a pair of spaced apart axially extending electrical connector mounting bars 77 and 78. Similarly, electrical connector sleeve 71 has mounted thereto a pair of electrical connector mounting bars 80 and 81.

Electrical connector mounting bars 77 and 78 have mounted therebetween a plurality of male multiprong electrical connectors 83 which are electrically interconnected with various wires of electrical conductor bundle 19 of streamer section 13b. Similarly, mounting bars 80 and 81 have mounted therebetween a plurality of female multisocket electrical connectors 85, which are electrically interconnected with various wires of electrical conductor bundle 19 of section 13a, and which are adapted for mating interconnection with male electrical connector 83. Electrical connectors 83 and 85 are axially immovably mounted to their respective mounting bars by means of screws 87.

Electrical connector sleeves 71a and 71b are connected together to form a substantially cylindrical electrical connector housing by means of jackscrews 89. A spacer 91 is positioned on jackscrew 89 to properly space apart electrical connector sleeves 71a and 71b. Torsional forces are transmitted across coupler 11 through interconnected electrical connector sleeves 71a and 71b.

Turning again to FIG. 1, each connector sleeve 21a and 21b has positioned thereabout a connector nut 93a and 93b, respectively. Each connector nut 93a and 93b is substantially identical, and each includes an axially extending externally threaded portion 95, and an inwardly facing shoulder 97, which is adapted to abut with shoulder 31 of connector sleeve 21a or 21b. Connector nut 93 includes a tapered outer external end portion 99 which slopes into contact with jacket 15 of streamer section 13b to give coupler 11 a streamlined external profile. Connector nut 93 includes a recessed internal portion 101 which permits connector nut 93 to be moved axially with respect to clamp 27 during assembly.

Connector nuts 93a and 93b are connected together by a cylindrical outer sleeve 103. Outer sleeve 103 includes internally threaded ends, which engage threaded portions 95 of connector nuts 93a and 93b. Outer sleeve 103 is made of a high tensile strength material and transmits tension forces across coupler 11 and isolates electrical connector sleeves 71a and 71b from such tension forces. Outer sleeve 103 surrounds electrical connector sleeves 71a and 71b and sealingly engages sealing surface 33 of connector sleeves 21a and 21b. Outer sleeve 103 thus forms a water tight closure to prevent water from reaching the interior of coupler 11. Connector nuts 93a and 93b and outer sleeve 103 are provided with spanner wrench holes 105 and 107 to facilitate make-up.

It is contemplated that the connector sleeves, stress member terminator blocks, and electrical conductor packing boxes would be assembled and mounted on the ends of the streamer sections at a shop or factory. Obviously, the connector nuts would be positioned around the streamer section jackets prior to fastening clamp 27. The electrical connector sleeves are likewise assembled, including connecting all the wires to the plugs 83 and 85, at the factory and attached to their respective connector sleeves.

In the field, one of the connector nuts, for example connector nut 93, is moved axially outwardly along sheath 15 of streamer section 13b a distance sufficient to allow outer sleeve 103 to be positioned about streamer section 13b. Electrical connector sleeves 71a and 71b are then connected together by jackscrews 89, thereby to mate electrical connectors 83 and 85. Then, outer sleeve 103 is moved axially toward coupler nut 93a and made-up. Then coupler nut 93b is likewise made-up. Coupler 11 is uncoupled, simply by unscrewing coupler nuts 93a and 93b and removing jackscrews 89.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompany drawings is to be interpreted as illustrative and not in a limiting sense.

What is claimed is:

1. A seismic streamer coupler for connecting together adjacent sections of a seismic streamer, each of said sections including a tubular outer jacket, at least one stress member within the outer jacket, and a plurality of electrical conductors within the outer jacket, said coupler comprising:

a pair of axially spaced apart generally cylindrical connector sleeves, each of said connector sleeves having means at one end for establishing a sealing interconnection with an outer jacket of one of said adjacent sections, each of said connector sleeves including a radially outwardly extending shoulder facing toward said one end, and each of said connector sleeves having an axial bore therethrough;

a pair of semi-cylindrical electrical connector sleeves, each of said electrical connector sleeves being mounted to and in axial alignment with the other end of one of said connector sleeves, each of said electrical connector sleeves having mounted thereto mateable electrical connector means for establishing electrical connection between said plurality of electrical conductors;

means for connecting together said electrical connector sleeves to mate said electrical connector means;

a pair of generally cylindrical stress member terminator blocks, each of said stress member terminator blocks being axially outwardly immovably mountable within one of said connector sleeves, each of said stress member terminator blocks including means for establishing a connection with one of said stress members, each of said stress member terminator blocks having an axial bore for the passage of said electrical conductors therethrough;

a pair of generally cylindrical connector nuts, each of said connector nuts including a radially inwardly extending shoulder abuttable with said radially outwardly extending shoulder of one of said connector sleeves, each of said connector nuts including a threaded portion;

a cylindrical outer sleeve mountable about said electrical connector sleeves and between said connector nuts, said outer sleeve including threaded ends that are engagable with the threaded end portions of said connector nuts to urge said connector nut shoulders into abutment with said connector sleeve shoulders;

and means for sealing between said outer sleeve and said connector sleeves.

2. The seismic streamer coupler as claimed in claim 1, including:

a pair of generally cylindrical conductor packing boxes, each of said conductor packing boxes being mountable within one of said stress member terminator bores, each said electrical conductor packing boxes having an axial bore for the passage of said electrical conductors therethrough;

means for potting said electrical conductors within said bores of said electrical conductor packing boxes;

and means for forming a seal between each of said electrical conductor packing boxes and the connector sleeve associated therewith.

3. The seismic streamer coupler as claimed in claim 1, wherein each of said electrical connector sleeves includes:

a half-cylinder body portion having a mounting flange at one end thereof for connection to one of said connector sleeves;

a pair of axially extending spaced apart mounting bars connected to said body portion, wherein said mateable electrical connectors are mounted to said mounting bars.

4. The seismic streamer coupler as claimed in claim 3, wherein said means for connecting together said electrical connector sleeves includes a plurality of bolts interconnecting adjacent pairs of said mounting bars.

5. The seismic streamer coupler as claimed in claim 1, wherein:

said threaded portions of said connector nuts are defined by axially extending externally threaded portions and said threaded ends of said outer sleeve are defined by a pair of spaced apart internally threaded portions threadedly engageable with said threaded portions of said connector nuts.

6. A seismic streamer, which comprises:

a pair of axially spaced apart tubular outer jackets;

at least one axially extending stress member within each outer jacket;

a plurality of axially extending electrical conductors within each outer jacket;

a pair of axially spaced apart generally cylindrical connector sleeves, each of said connector sleeves being sealingly connected at one end to one of said outer jackets, each of said connector sleeves including a radially outwardly extending shoulder facing toward said one end, and each of said connector sleeves having an axial bore therethrough;

a pair of generally cylindrical stress member terminator blocks, each of said stress member terminator blocks being mounted within the bore of one of said connector sleeves axially immovable toward said one end, each of said stress member terminator blocks being connected to said at least one stress member, and each of said stress member terminator blocks having an axially extending bore for the passage of said electrical conductors therethrough;

a pair of semi-cylindrical electrical connector sleeves mounted between said connector sleeves, each of said electrical connector sleeves being connected to the other end of one of said connector sleeves, and each of said electrical connector sleeves having mounted thereto mateable electrical connector means for establishing electrical connection between said plurality of electrical conductors;

means for connecting together said electrical connector sleeves to mate said electrical connector means;

a pair of generally cylindrical connector nuts, each of said connector nuts being mounted about one of said connector sleeves, is each of said connecter nuts including a radially inwardly extending shoulder in abutment with said radially outwardly extending shoulder of said connector sleeve, each of said connector nuts including a threaded portion;

a cylindrical outer sleeve mounted about said electrical connector sleeves said outer sleeve including threaded ends engaged with the threaded portions of said connector nuts to hold said connector nut shoulders against said connector sleeve shoulders;

and means for sealing between said outer sleeve and said connector sleeves.

7. The seismic streamer as claimed in claim 6, including:

a pair of generally cylindrical conductor packing boxes, each of said conductor packing boxes being mounted within one of said stress member terminator bores, each said electrical conductor packing boxes having an axial bore for the passage of said electrical conductors therethrough;

means for potting said electrical conductors within said bores of said electrical conductor packing boxes;

and means for forming a seal between each of said electrical conductor packing boxes and the connector sleeve associated therewith.

8. The seismic streamer as claimed in claim 6, wherein each of said electrical connector sleeves includes:

a half-cylinder body portion having a mounting flange at one end thereof for connection to one of said connector sleeves;

a pair of axially extending spaced apart mounting bars connected to said body portion, wherein said mateable electrical connectors are mounted to said mounting bars.

9. The seismic streamer as claimed in claim 8, wherein said means for connecting together said electrical connector sleeves includes a plurality of bolts interconnecting adjacent pairs of said mounting bars.

10. The seismic streamer as claimed in claim 6, wherein:

said threaded portions of said connector nuts are defined by axially extending externally threaded portions and said threaded ends of said outer sleeve are defined by a pair of spaced apart internally threaded portions threadedly engageable with said threaded portions of said connector nuts.

11. A seismic streamer coupler for connecting together adjacent sections of a seismic streamer, each of said sections including a tubular outer jacket, at least one stress member within the outer jacket, and a plurality of electrical conductors within the outer jacket, said coupler comprising:

a pair of axially spaced apart generally cylindrical connector sleeves, each of said connector sleeves having means at one end for establishing a sealing interconnection with an outer jacket of one of said adjacent sections, each of said connector sleeves including a radially outwardly extending shoulder facing toward said one end, and each of said connector sleeves having an axial bore therethrough;

a pair of electrical connectors, each of said electrical connectors being mountable between said connector sleeves, each of said electrical connectors including mateable means for establishing electrical connection between said plurality of electrical conductors;

a pair of generally cylindrical stress member terminator blocks, each of said stress member terminator blocks being axially outwardly immovably mountable within one of said connector sleeves, each of said stress member terminator blocks including means for establishing a connection with one of said stress members, each of said stress member terminator blocks having an axial bore for the passage of said electrical conductors therethrough;

a pair of generally cylindrical connector nuts, each of said connector nuts including a radially inwardly extending shoulder abuttable with said radially outwardly extending shoulder of one of said connector sleeves, each of said connector nuts including a threaded portion;

a cylindrical outer sleeve mountable about said electrical connectors and between said connector nuts, said outer sleeve including threaded ends that are engagable with the threaded end portions of said connector nuts to urge said connector nut shoulders into abutment with said connector sleeve shoulders;

and means for sealing between said outer sleeve and said connector sleeves.

12. The seismic streamer coupler as claimed in claim 11, including:

a pair of generally cylindrical conductor packing boxes, each of said conductor packing boxes being mountable within one of said stress member terminator bores, each said electrical conductor packing boxes having an axial bore for the passage of said electrical conductors therethrough;

means for potting said electrical conductors within said bores of said electrical conductor packing boxes;

and means for forming a seal between each of said electrical conductor packing boxes and the connector sleeve associated therewith.

13. The seismic streamer coupler as claimed in claim 11, wherein each of said electrical connectors includes:

a half-cylinder body portion having a mounting flange at one end thereof for connection to one of said connector sleeves;

a pair of axially extending spaced apart mounting bars connected to said body portion, wherein said mateable means are mounted to said mounting bars.

14. The seismic streamer coupler as claimed in claim 13, including means for connecting together said body portions of said electrical connectors including a plurality of bolts interconnecting adjacent pairs of said mounting bars.

15. The seismic streamer coupler as claimed in claim 11, wherein:

said threaded portions of said connector nuts are defined by axially extending externally threaded portions and said threaded ends of said outer sleeve are defined by a pair of spaced apart internally threaded portions threadedly engageable with said threaded portions of said connector nuts.

* * * * *